(12) United States Patent
Anderson et al.

(10) Patent No.: US 11,045,827 B2
(45) Date of Patent: Jun. 29, 2021

(54) SPREADER

(71) Applicant: GVM, INC., East Berlin, PA (US)

(72) Inventors: Mark W. Anderson, Aspers, PA (US); Larry L. Hoover, Carlisle, PA (US)

(73) Assignee: GVM, Inc., East Berlin, PA (US)

( * ) Notice: Subject to any disclaimer, the term of this patent is extended or adjusted under 35 U.S.C. 154(b) by 0 days.

(21) Appl. No.: 15/676,248

(22) Filed: Aug. 14, 2017

(65) Prior Publication Data

US 2019/0047004 A1  Feb. 14, 2019

(51) Int. Cl.
| | |
|---|---|
| *A01C 17/00* | (2006.01) |
| *B05B 12/12* | (2006.01) |
| *B05B 3/10* | (2006.01) |
| *B05B 9/00* | (2006.01) |
| *A01C 21/00* | (2006.01) |
| *A01C 15/00* | (2006.01) |

(52) U.S. Cl.
CPC ............ *B05B 12/12* (2013.01); *A01C 17/006* (2013.01); *B05B 3/1035* (2013.01); *B05B 3/1057* (2013.01); *B05B 3/1085* (2013.01); *B05B 9/007* (2013.01); *A01C 15/006* (2013.01); *A01C 17/001* (2013.01); *A01C 21/005* (2013.01)

(58) Field of Classification Search
CPC ... B05B 3/1021; B05B 3/1007; B05B 7/0815; A01C 3/063; A01C 17/001; A01M 7/0028
USPC ............................................................ 239/7
See application file for complete search history.

(56) References Cited

U.S. PATENT DOCUMENTS

| | | | |
|---|---|---|---|
| 6,027,053 A | 2/2000 | Anderson et al. | |
| 6,068,200 A * | 5/2000 | Kime | E01C 19/203 239/176 |
| 6,209,808 B1 | 4/2001 | Anderson | |
| 8,777,707 B2 | 7/2014 | Hoyle | |
| 9,649,646 B1 | 5/2017 | Podoll et al. | |
| 2003/0194273 A1 * | 10/2003 | Lloyd | E01C 23/065 404/83 |
| 2013/0341437 A1 | 12/2013 | Richardson et al. | |

FOREIGN PATENT DOCUMENTS

EP          2198683 A1    6/2010

* cited by examiner

*Primary Examiner* — Chee-Chong Lee
(74) *Attorney, Agent, or Firm* — McNees Wallace & Nurick LLC

(57) ABSTRACT

A spreader for spreading a material including at least one pair of rotating discs having a plurality of generally radially oriented blades attached thereon for disbursing the material in a pre-selected pattern. The discs are rotatably positioned below an end of a funnel unit to receive material passing through the funnel units. The material, as it passes through the funnel units, is directed to a predetermined impact region on each of the rotating discs by a corresponding pair of deflecting vanes integrally fit and movably attached within each funnel of the pair of funnel units. Each deflecting vane is selectably movable by a corresponding actuator from a first position to a second position while the spreader is operating.

22 Claims, 14 Drawing Sheets

SPREADER

FIELD OF THE INVENTION

Figure 1:
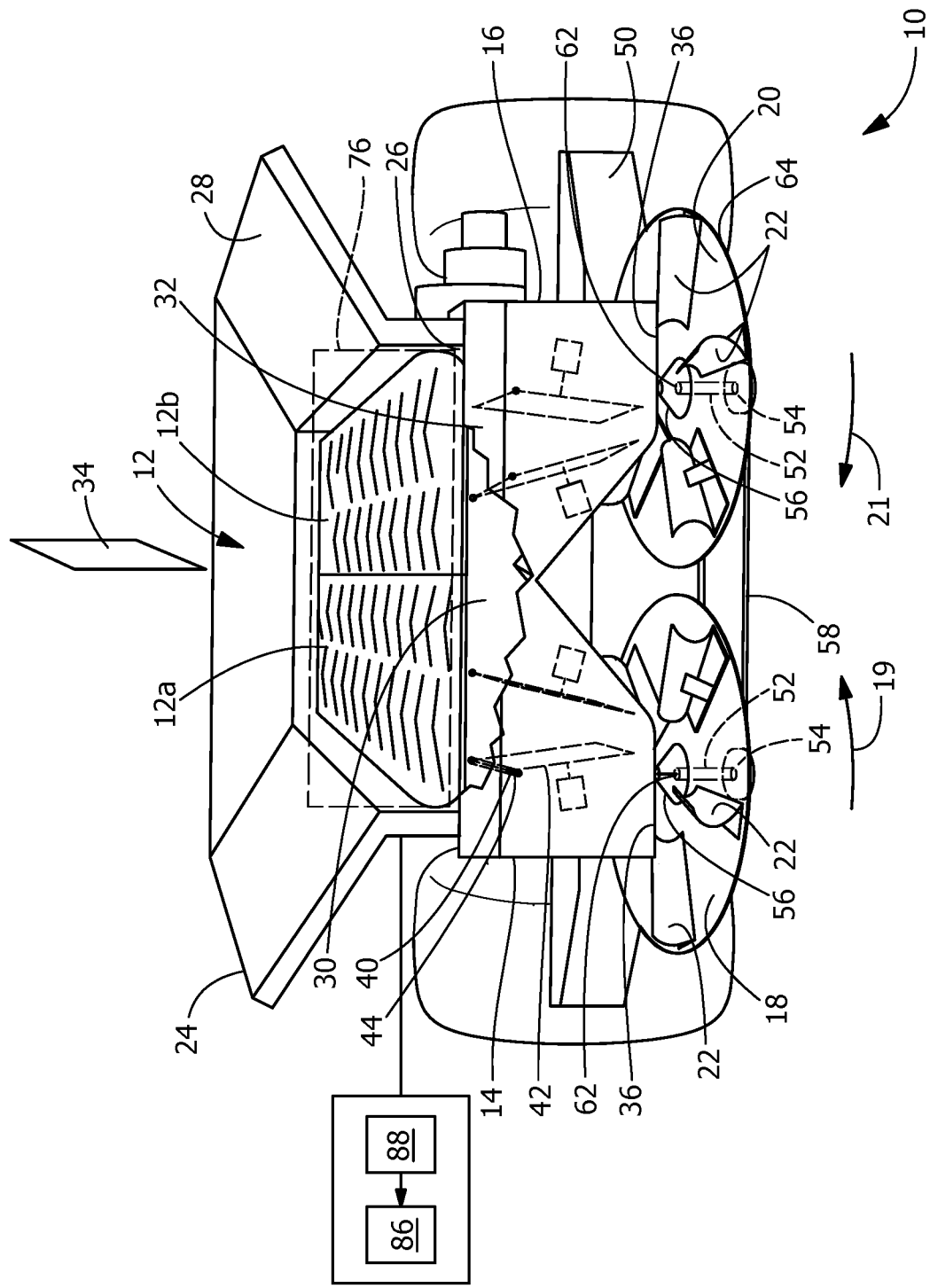

The present invention is directed to a spreader utilized to evenly distribute material, and specifically to a spreader attached to a farm vehicle to distribute granular and/or powdery material.

BACKGROUND OF THE INVENTION

Farmers, landscapers, and others needing to spread material over large areas need a spreading device that will allow for rapid distribution of the material being spread, covering a large area in an even spread pattern, completed in a reasonably short period of time. The spreading device often determines the success of the operation.

Dual disc centrifugal spreaders are well known in the art. They generally are comprised of flat discs that cast off particulate material in a horizontal plane. A particularly successful dual disc centrifugal spreader is the DOUBLE DUTY spreader available from GVM, Inc. of East Berlin, Pa. and described in U.S. Pat. No. 6,209,808.

However, with this and other dual disc centrifugal spreaders, inefficiencies in the form of over or under spread can occur at the ends of fields, particularly in fields defined by irregular shapes, having, for example, adjacent sides that subtend an acute angle. In such instances, in which all portions of the field are to receive a minimum amount of spread material, if the material spreading pattern of each spinning disc is constrained to uniform spreading patterns, even if it is possible to provide a reduced material flow pattern, the amount of overspread material may be significant. This problem is accentuated in fields of row crops, which limits the freedom of travel of the vehicle to which the spreader is attached from turning prior to the end of the row.

One solution is proposed in U.S. Pat. No. 8,777,707 to Hoyle, which utilizes GPS to compare a preferred path to an actual travel path and calculate a required pattern and density based on that comparison that is accomplished by adjusting the flow of material to each spinning disc and independently controlling the rotational speed of each spinning disc relative to one another. Among the drawbacks of this system is that this system relies on the need to compare a preferred path to the actual path, and further, that while adjusting the speed of the spinners can help achieve an asymmetric spread pattern that increases the amount of material spread at distances nearer the spreader and decreases those at the far end of its range, it cannot adjust to increase the amount of material spread at the far range of the spreader range while not spreading at the near end of the range. This deficiency further restricts the ability of such systems to be readily used in fields having cultivated rows without still achieving overspread.

What is needed, therefore, is an improved device that can selectably provide a uniform scatter pattern and throw width, such as while traveling along a cultivated field, while also providing an optimal overlapping of the scatter pattern produced by multiple discs, both toward the outside or periphery of the pattern, and in the area directly behind the vehicle, but that can also selectably provide a non-uniform scatter pattern with the same throw width, such as while traveling along portions of an irregularly shaped field.

SUMMARY OF THE INVENTION

An embodiment is directed to a spreader for spreading a material including at least one pair of funnel units, each unit having a first end and an opposed second end. The spreader further provides each unit having a pair of deflecting vanes substantially positioned therein between the first end and the second end, each deflecting vane of the pair of deflecting vanes movably connected to an actuator. The spreader further provides at least one pair of adjacent rotating discs having a plurality of generally radially oriented blades attached thereon for disbursing the material in a pre-selected pattern. The spreader further provides each of a first disc and a second disc of the at least one pair of adjacent rotating discs rotatably positioned below the second end of one funnel unit of the at least one pair of funnel units to receive the material passing through the funnel units. The material as it passes through the at least one pair of funnel units is directed to a predetermined impact region on each of the rotating discs by a corresponding pair of deflecting vanes integrally fit and movably attached within each funnel of the pair of funnel units. Each deflecting vane of the pair of deflecting vanes is selectably movable by a corresponding actuator from a first position to a second position while the spreader is operating.

A further embodiment is directed to an apparatus for spreading a material including a hopper having a dispensing device and a dispensing outlet for dispensing material, the dispensing device positioned intermediate the hopper and the dispensing outlet. The apparatus further provides at least one pair of funnel units, each unit having a first end and an opposed second end. The apparatus further provides each unit having a pair of deflecting vanes substantially positioned therein between the first end and the second end, each deflecting vane of the pair of deflecting vanes movably connected to an actuator. The apparatus further provides the at least one pair of funnel units attached in a generally vertical plane adjacent to the hopper such that each funnel unit first end receives the material from the hopper dispensing outlet and each funnel unit second end discharges the received material. The apparatus further provides at least one pair of rotating discs comprised of a first disc and a second disc, the first and second discs having a plurality of blades attached thereon for dispersing the material from the funnel second end in a pre-selected pattern. The apparatus further provides the first and second discs each rotatably positioned below a corresponding one of the at least one pair of funnel units second ends to receive material passing through the second end of the funnel units. The material as it passes through the second end of the corresponding funnel unit is directed to at least one pre-selected impact region on each disc of the pair of rotating discs by a corresponding pair of deflecting vanes integrally fit and movably attached within the corresponding funnel unit. Each deflecting vane of the pair of deflecting vanes is movable by a corresponding actuator from a first position to a second position while the apparatus is operating. The apparatus further includes a Global Positioning System (GPS) receiver for sensing the position of the apparatus and providing an output signal indicative of a position of the apparatus to a controller. The controller calculates a required pattern and density of material to be spread by the pair of rotating discs based on the position of the apparatus, and controls a rate at which the dispensing device dispenses the material to the pair of rotating discs, and a position of the at least one pre-selected impact region on each disc of the pair of rotating discs by a corresponding pair of deflecting vanes in order to obtain the required pattern and density of spread material. The apparatus is capable of operating while maintaining a constant rotational speed of the first disc the same as a rotational speed of the second disc.

Figure 2:
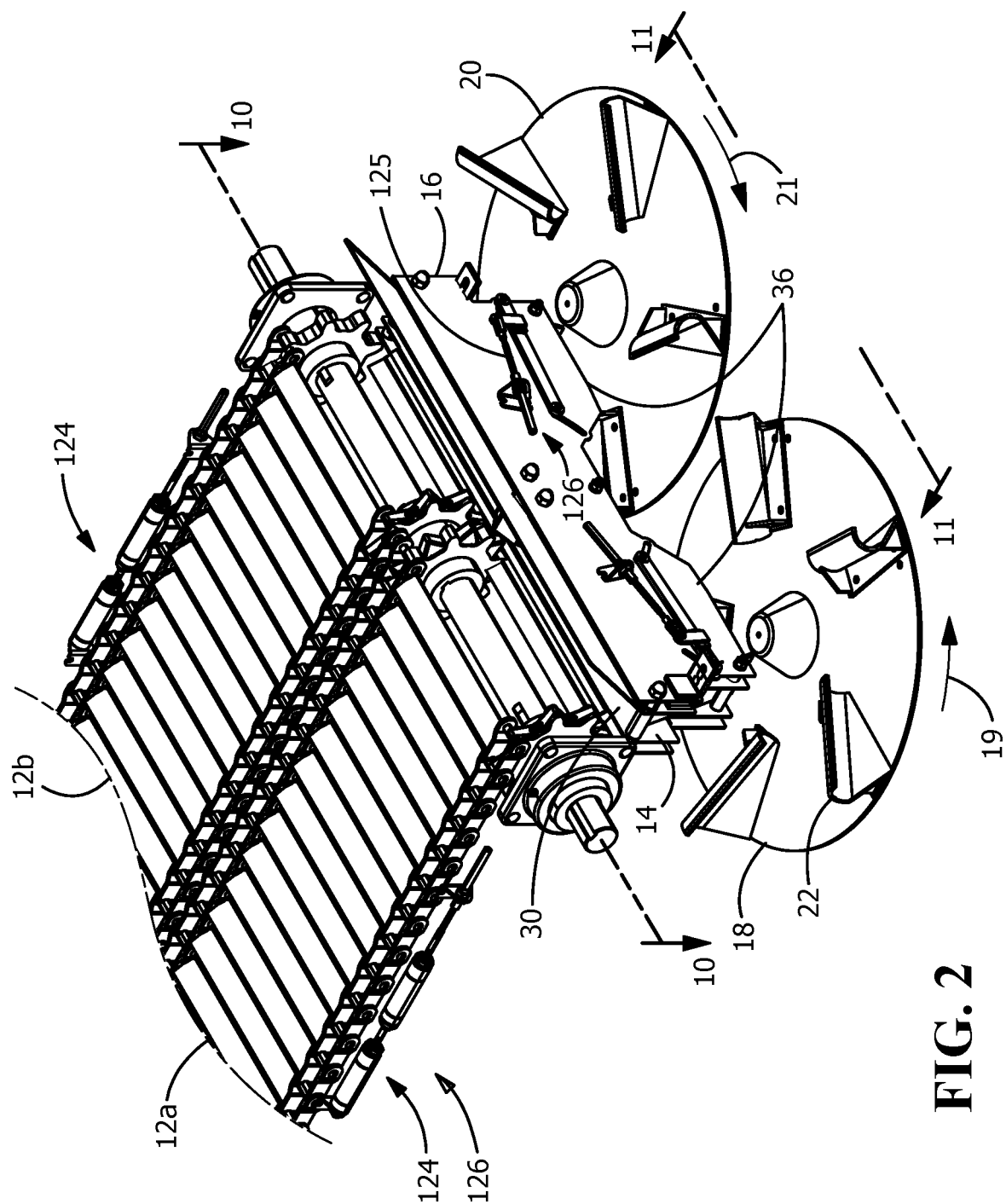
Figure 2A:
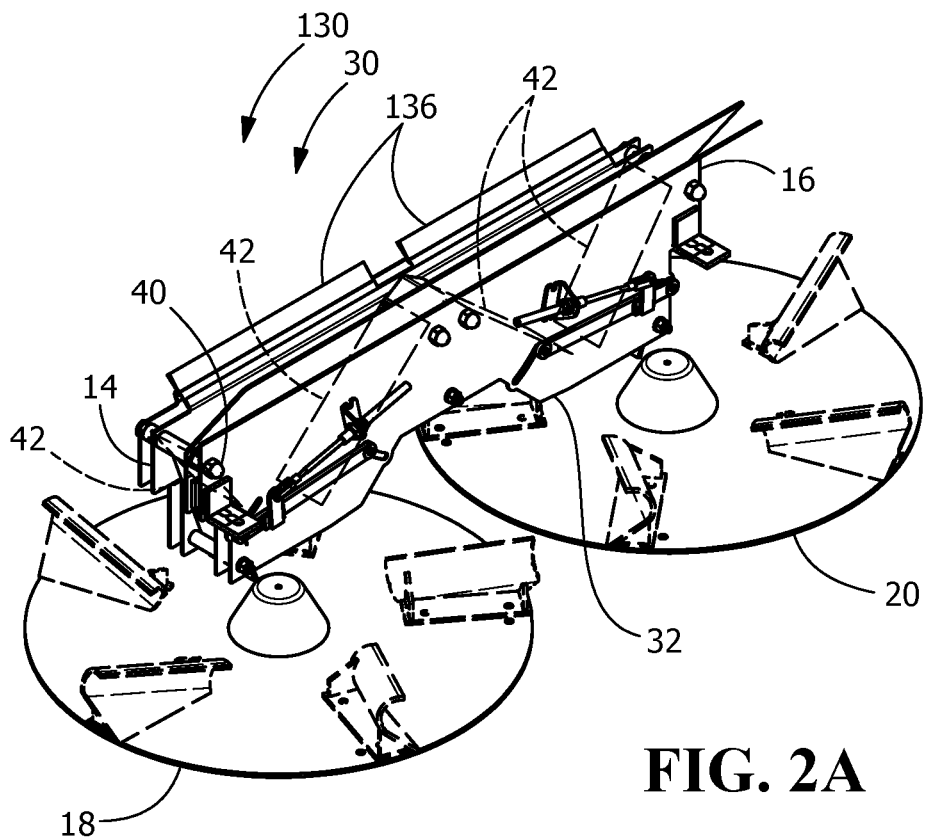
Figure 3:
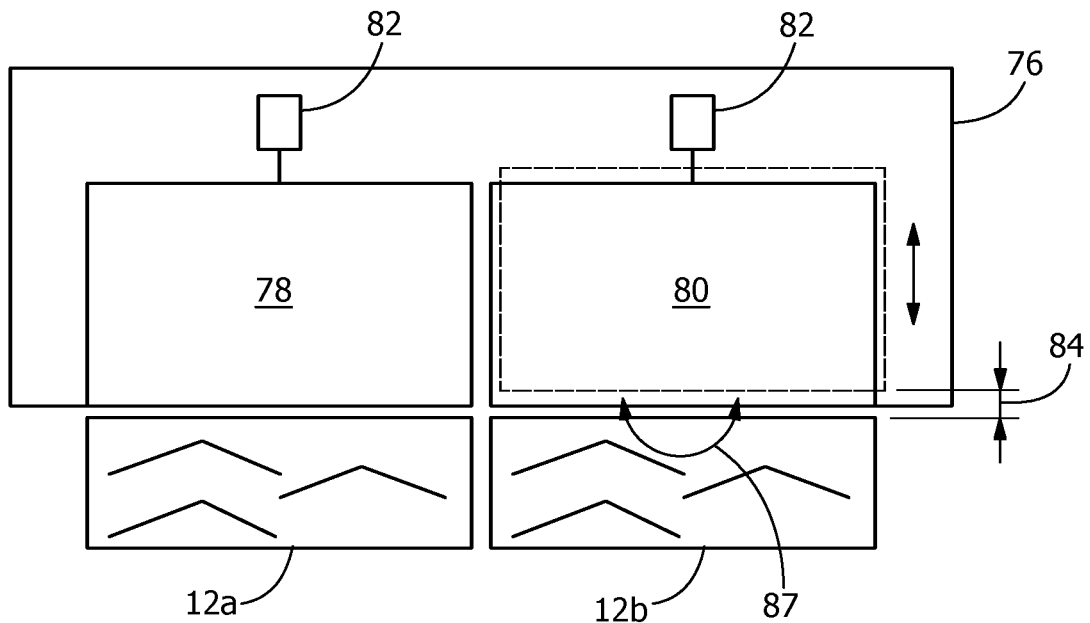

A yet further embodiment is directed to a method of spreading a material from an apparatus including providing a hopper having a dispensing device and a dispensing outlet for dispensing material, the dispensing device positioned intermediate the hopper and the dispensing outlet. The method further includes providing at least one pair of funnel units, each unit having a first end and an opposed second end, each unit having a pair of deflecting vanes positioned therein between the first end and the second end, each deflecting vane of the pair of deflecting vanes movably connected to an actuator, the at least one pair of funnel units attached in a generally vertical plane adjacent to the hopper such that each funnel unit first end receives the material from the hopper dispensing outlet and each funnel unit second end discharges the received material. The method further includes providing at least one pair of rotating discs comprised of a first disc and a second disc, the first and second discs having a plurality of blades attached thereon for dispersing the material from the funnel second end in a pre-selected pattern, the first and second discs each rotatably positioned below a corresponding one of the at least one pair of funnel units second ends to receive material passing through the second end of the funnel units, wherein the material as it passes through the second end of the corresponding funnel unit is directed to at least one pre-selected impact region on each disc of the pair of rotating discs by a corresponding pair of deflecting vanes integrally fit and movably attached within the corresponding funnel unit, wherein each deflecting vane of the pair of deflecting vanes is movable by a corresponding actuator from a first position to a second position while the apparatus is operating. The method further includes controlling a rate at which the dispensing device dispenses the material to the pair of rotating discs, and controlling a position of the at least one pre-selected impact region on each disc of the pair of rotating discs. The apparatus is capable of operating while maintaining a constant rotational speed of the first disc the same as a rotational speed of the second disc.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a rear elevation view of an exemplary spreader attached to a farm vehicle with a hopper positioned over the vehicle frame.

FIG. 2 is an upper perspective cutaway view of an exemplary dispensing device, funnel units and rotating discs.

FIG. 2A is an upper perspective cutaway view of the funnel units and rotating discs of FIG. 2.

FIG. 2B is an upper perspective cutaway view of exemplary deflection vanes, as well as the funnel units and rotating discs of FIG. 2.

FIG. 3 is an elevation view of an exemplary door mechanism.

FIG. 3A is an elevation view of an exemplary door mechanism.

FIG. 3B is an elevation view of an exemplary door mechanism.

FIG. 4 is an upper perspective view of an exemplary drop box comprising first and second funnel units.

FIG. 5 is an elevation view of an exemplary deflecting vane.

FIG. 6 is a representation of the angle formed by the top edge of an exemplary blade and the plane of the disc.

FIG. 7 is a rear view of a blade.

FIG. 8 is a front view of a blade.

FIG. 9 is an upper perspective view of an exemplary drop box comprising first and second funnel units.

FIG. 10 is a view of the drop box and first and second funnel units taken along line 10-10 of FIG. 2.

FIG. 11-13 are views taken of the dispensing device, funnel units and rotating discs taken along line 11-11 of FIG. 2.

FIG. 14 is a graphical representation of different spectrums of material distribution versus distance.

FIG. 15 is a rear elevation view of an exemplary spreader attached to a farm vehicle with a hopper positioned over the vehicle frame.

Wherever possible, the same reference numbers will be used throughout the drawings to represent the same parts.

DETAILED DESCRIPTION OF THE INVENTION

The description of illustrative embodiments according to principles of the present invention is intended to be read in connection with the accompanying drawings, which are to be considered part of the entire written description. Terms such as “attached,” “affixed,” “connected,” “coupled,” “interconnected,” “engaged,” “installed” and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

It is to be understood that operating features of the spreader of the present invention are discussed in U.S. Pat. No. 6,209,808 titled “Spreader Attachment” which is herein incorporated by reference in its entirety.

FIG. 1 shows an exemplary spreader 10 of the present invention. Spreader 10 is comprised of a dispensing device 12, first 14 and second 16 funnel units, and a first 18 and second 20 rotating disc, each disc having a plurality of blades 22 attached thereon. The spreader of the present invention is mechanically attached, for example, by bolting or welding to the storage vehicle 24, such that spreader 10 is cantilevered off storage vehicle 24, and positioned below an exit orifice 26 of a hopper 28, which hopper 28 being attached to the storage vehicle frame.

As shown, dispensing device 12 is a continuous belt constructed of suitable flexible material such as rubber or chain with slats, but may be any transport method, for example, a screw type worm. Dispensing device 12 terminates at a point above a drop box 30 comprising a first funnel unit 14 and a second funnel unit 16, so as to deposit material being transported by the dispensing device 12 into these funnel units at each funnel unit first end 32. As further shown in FIG. 1, first and second funnel units 14, 16 are positioned in such a manner so as to receive substantially equal amounts of material being conveyed. This may be accomplished, for example, by placing first and second funnel units 14, 16 side by side at the terminal end of dispensing device 12.

Optionally, as shown in FIGS. 1, 2, 3 and 3A, dispensing device 12 may be divided into two separate dispensing devices 12a, 12b (e.g., a split belt or chain), in which dispensing device 12a provides material to first funnel unit 14 (FIGS. 1, 2, and 2A) and dispensing device 12b provides material to second funnel unit 16 (FIGS. 1, 2, and 2A). As shown in FIG. 2A, first and second funnel units 14, 16 may include wipers 136 for removing material from respective dispensing devices 12a, 12b (FIG. 2) that may not otherwise be removed by gravity into funnel units 14, 16. Wipers 136 may be composed of a flexible material, such as rubber, fibrous brush, or other suitable material. In one embodiment the wipers may be composed of a rigid material positioned in sufficiently close proximity to dispensing devices 12a, 12b for removing material therefrom and into funnel units 14, 16. Dispensing devices 12a, 12b can be independently powered such as by the variable speed electric motor or hydraulic power or other suitable driving arrangement and operated at different speeds to provide different feed rates of material into the corresponding first and second funnel units 14, 16. As shown in FIG. 3, a door assembly 76 comprises a door 78 associated with dispensing device 12a, and a door 80 associated with dispensing device 12b. Actuators 82 raise/lower respective doors 78, 80 to control a gap 84 between the bottom of the doors and dispensing devices 12a, 12b. That is, increasing gap 84 similarly increases the amount of material that can be dispensed by dispensing devices 12a, 12b, and decreasing gap 84 similarly decreases the amount of material that can be dispensed by dispensing devices 12a, 12b. Gap 84 can be decreased to a closed position such that essentially no flow of material is provided by the dispensing devices. In one embodiment, actuators 82 can, in addition to raising/lowering doors 78, 80, also urge doors 78, 80 into rotational movement 87.

Figure 3B:
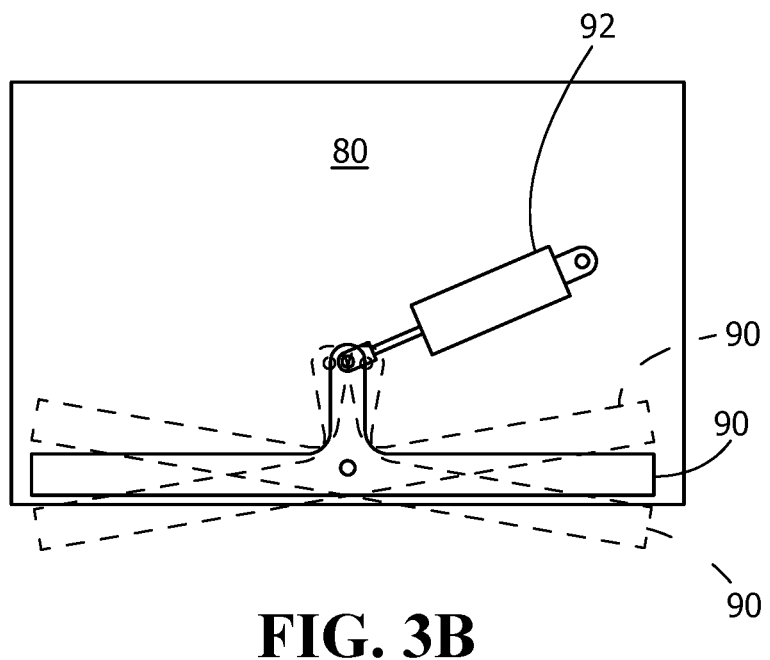
Figure 3A:
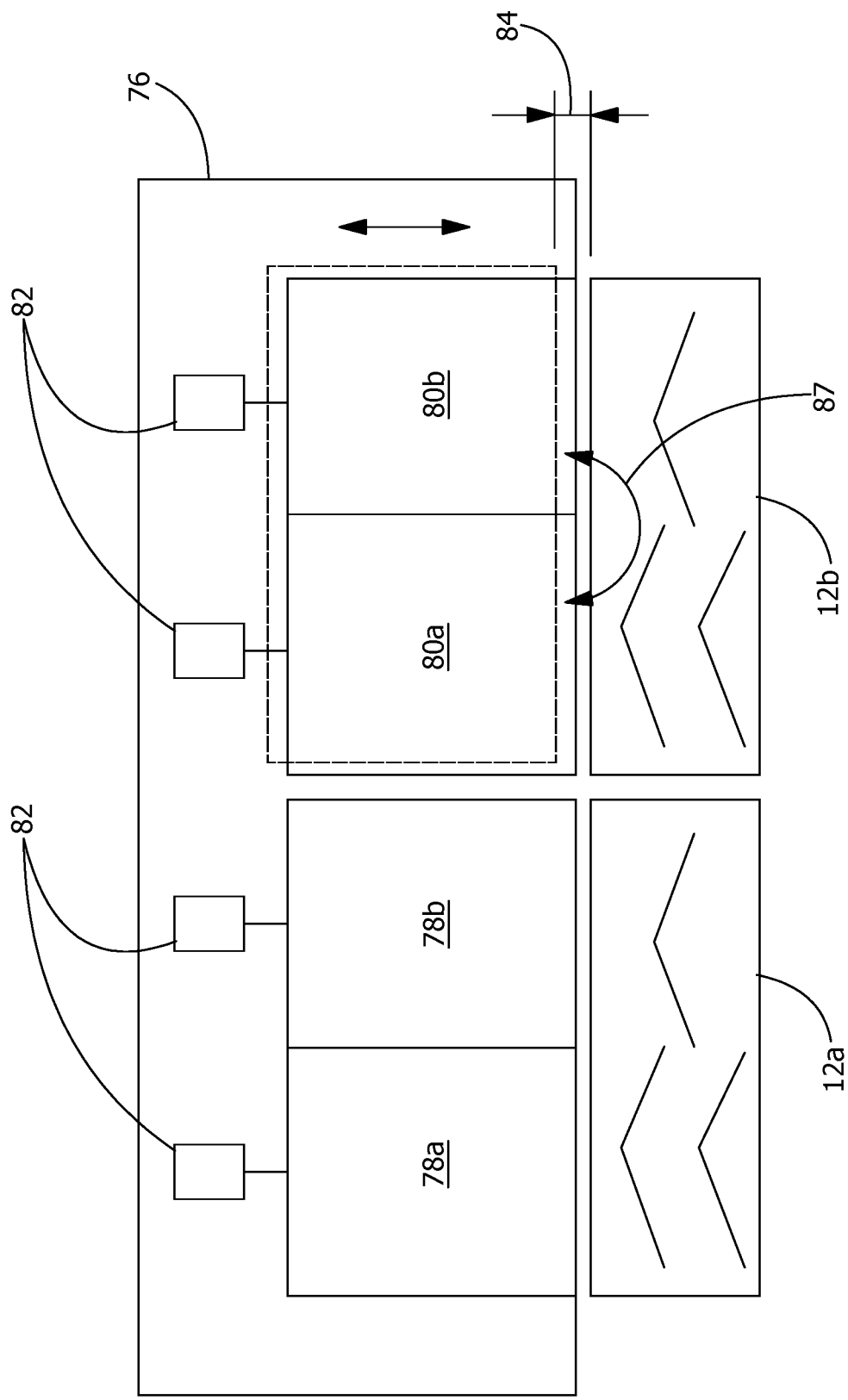

In one embodiment, as shown in FIG. 3A, door assembly 76 comprises a pair of doors 78a, 78b associated with dispensing device 12a, and a pair of doors 80a, 80b associated with dispensing device 12b. Actuators 82 raise/lower respective doors 78a, 78b, 80a, 80, 80b to control a gap 84 between the bottom of the doors and dispensing devices 12a, 12b. That is, increasing gap 84 similarly increases the amount of material that can be dispensed by dispensing devices 12a, 12b, and decreasing gap 84 similarly decreases the amount of material that can be dispensed by dispensing devices 12a, 12b. Gap 84 can be decreased to a closed position such that essentially no flow of material is provided by the dispensing devices 12a, 12b. In one embodiment, corresponding actuators 82 can, in addition to raising/lowering doors 78a, 78b, 80a, 80b, also urge doors 78a, 78b, 80a, 80b into rotational movement 87. In one embodiment, one or more of actuators 82 may be connected to a common driving source (not shown) such as an electric, pneumatic and/or hydraulic source for drivably moving a corresponding door 78, 78a, 78b, 80, 80a, 80b (FIGS. 3 and 3A). In one embodiment, one or more of actuators 82 and one or more of actuators 48 (FIG. 4) may be drivably connected to a corresponding door 78a, 78b, 80a, 80b by a common driving source (not shown) such as an electric, pneumatic and/or hydraulic source for drivably moving a corresponding door 78, 78a, 78b, 80, 80a, 80b and deflecting vane(s) 42 (FIG. 4) as will be discussed in additional detail below.

Figure 5:
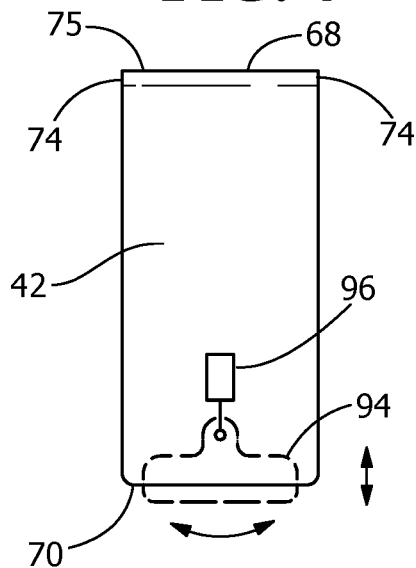

FIG. 3B shows an optional exemplary embodiment of door 80, which could also be incorporated into door 78. An edge extension device 90 (FIG. 3B) is pivotably connected to door 80 and is urged into rotational movement by an actuator 92 for providing enhanced control of material flow between door 80 and dispensing device 12b (FIG. 3), by selectively controlling the gap therebetween. In one embodiment, an edge extension device 90 may also be pivotably connected to one or more of doors 80a, 80b, and/or to one or more of doors 78a, 78b. Optionally, as shown in FIG. 5, an edge extension device 94 is operably connected to deflecting vane 42, in which an actuator 96 urges the edge extension device into one or more of axial movement and rotational movement relative to deflecting vane 42 for providing enhanced control of material flow between corresponding pairs of the deflecting vanes so as to direct the passing material to strike a specific region on rotating disc 20 (FIG. 1) as will be discussed in further detail below.

Figure 2B:
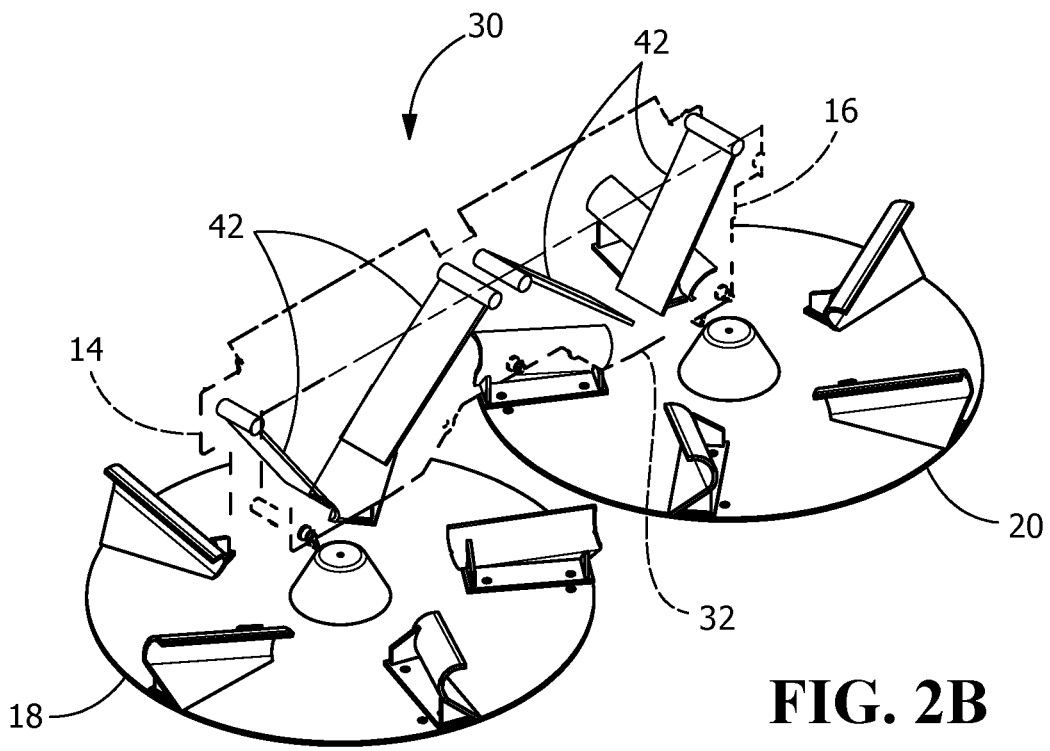
Figure 4:
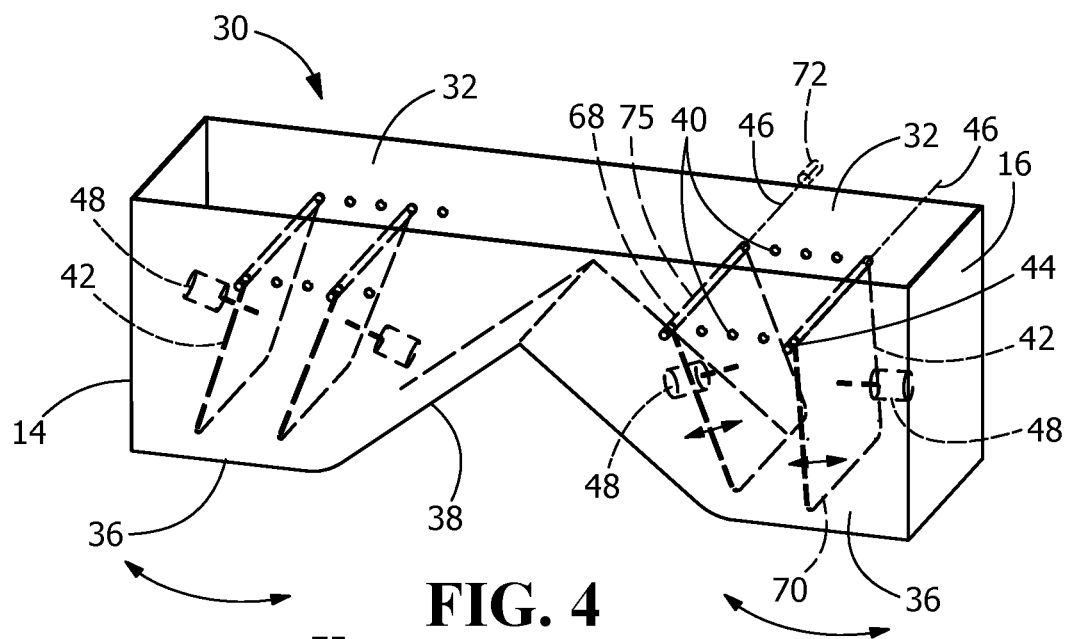

As further shown in FIGS. 1, 2 and 2A, first and second funnel units 14, 16 are mirror images of one another relative to a center plane 34 (FIG. 1). For the sake of brevity, only one will be described in detail, however, it should be appreciated that this detailed description applies to both funnel units. As shown in FIG. 4, second funnel unit 16 is comprised of rigid or semi-rigid material such as, for example, stainless steel, aluminum or other metal, or it may be manufactured of plastic such as polycarbonate, polystyrene, nylon or other corrosive resistant material. The second funnel unit 16 is wider at funnel unit first end 32 than at funnel unit second end 36, with a rectangular cross section, with at least one sloping side 38 connecting the funnel unit first end 32 with the funnel unit second end 36. In one embodiment, such as shown in FIGS. 4 and 5, a plurality of matched receiving openings 40 located in the front and rear walls of second funnel unit 16 are utilized for aligning axially with corresponding openings 74 (FIG. 5) formed in an actuation bar 75 at an end 68 of each deflecting vane 42. In one embodiment, such as shown in FIGS. 2A and 5, only one pair of matched openings 40 is provided for each corresponding end 68 of deflector valve 42. As shown in FIGS. 2B, 4 and 5, deflecting vane 42 is a rectangular flat sheet, sized to integrally fit substantially within drop box 30. That is, as further shown in FIG. 4, an end 70 of deflecting vanes 42 opposite end 68 may at least partially extend past funnel unit second end 36. End 68 of the vane 42 includes an actuation bar 75 having a pair of opposed laterally extending openings 74 that are each in alignment with one opening 40 of a set of matched receiving openings 40. Each aligned opening 40 of second funnel unit 16 and corresponding vane opening 74 receives a fastener 44, allowing the deflecting vane 42 to rotate in an arc about an axis 46.

As further shown in FIG. 4, an actuator 48 is associated with each deflecting vane 42. Actuator 48 may be positioned within drop box 30 or extend into drop box 30 to control the rotational position or orientation of deflecting vane 42 in the drop box. That is, by extending at least one end of actuator 48 in a direction away from the rest of the actuator, effectively increasing the length of the actuator, deflecting vane 42 is likewise rotated about axis 46 in a rotational direction away from the actuator. Similarly, by retracting at least one end of actuator 48 in a direction toward the rest of the actuator, effectively decreasing the length of the actuator, deflecting vane 42 is likewise rotated toward an axis 46 in a rotational direction toward the actuator. In one embodiment, one or more actuators 72 may be positioned exterior of drop box 30, such as by a connection with an actuation bar 75 of a corresponding deflecting vane 42 for rotatably driving deflecting vane 42. As further shown in FIG. 4, each funnel unit 14, 16 has a pair of deflecting vanes 42. The pair of actuators 48 allows for accurate positioning of each corresponding deflecting vane 42 so as to direct the passing material to strike a specific region on a rotating disc 20 (FIG. 1) as will be discussed in further detail below. As a result of actuators 48, the rotational positions of each of the deflecting vanes can be adjusted while the spreader is operating (which was not previously possible using conventional manually-operated adjustments), permitting optimal scatter patterns, including both selective uniform material application patterns and non-uniform material application patterns. In one embodiment, at least one actuator 48 is an electronic stepper motor. In one embodiment, actuator 48 utilizes hydraulics, pneumatics, electro-mechanical devices, a combination thereof or other suitable driving arrangement.

For reasons appreciated by those having ordinary skill in the art, due at least to exposure to discs rotating at high speeds, as well as exposure to particulate material cast at high velocity from the discs during operation, conventional manually-operated adjustment features for positioning the deflecting vanes cannot be safely accessed/adjusted while the spreader is operating. It is also understood by those having ordinary skill in the art that shutting down a spreader in order to make such manual adjustments to the scatter pattern, especially when multiple adjustments would need to be made in short periods of time, is unfeasible.

Referring again to FIG. 1, positioned behind second funnel unit 16 and extending outward in a generally vertical direction towards the periphery is a vane or shield or splash plate or splash guard 50 used to prevent material from being thrown forward underneath the storage vehicle 24. This plate may be manufactured of any rigid or semi-rigid material such as, for example, stainless steel, aluminum, or other metal, or plastic, for example, such as polycarbonate, polystyrene, nylon or other corrosive resistant material.

Positioned below the second funnel unit 16 so as to receive material exiting from the second funnel unit 16 is a disc 20 rotatably attached by a spindle 52 to a spindle support housing 54. As shown, disc 20 rotates about spindle 52 in rotational direction 21, and disc 18 rotates about spindle 52 in rotational direction 19. Disc 20 diameter ranges from about 18 inches to about 50 inches, preferably 36 inches, and most preferably, 24 inches. Disc 20 is mechanically attached to the spindle 52 such as by, for example, utilizing a nut and rubber washer combination so that the disc is secured to the spindle 52 so as not to turn freely around it, a non-round receiving hole, matched to fit the spindle end, or the disc may be welded to the spindle 52.

With discs 18, 20 rotating in respective directions, 19, 21, the minimum distance from the splash guard 50 to the spindle 52 is about 16 inches with a maximum distance of about 36 inches, preferably about 18 inches for a twenty-four inch diameter disc. The minimum distance would increase with increasing disc diameter.

Positioned directly above the attachment point of disc 20 to spindle 52 is a conically shaped cap 56 utilized to deflect material falling from second funnel unit 16 outward towards the periphery 64 of the disc. Cap 56 can be made of any wear material, but nylon is preferred because it is inexpensive and easy to form. Spindle 52 is rotatably received in spindle support housing 54, the housing 54 being attached to a cross-member 58, and is hydraulically powered to achieve a constant revolutions per minute ("RPM") of about 500 RPM to about 1200 RPM, preferably about 600 RPM to about 900 RPM. Alternatively, the spindle 52 may receive power through the use of an electric motor or it may be mechanically linked to the storage vehicle axle and geared to provide power to rotate the disc at a constant RPM. In one embodiment, spindle 52 can be operated at variable RPM. In one embodiment, the spindles of discs 18, 20 can be operated at variable RPM and independently of each other.

Figure 6:
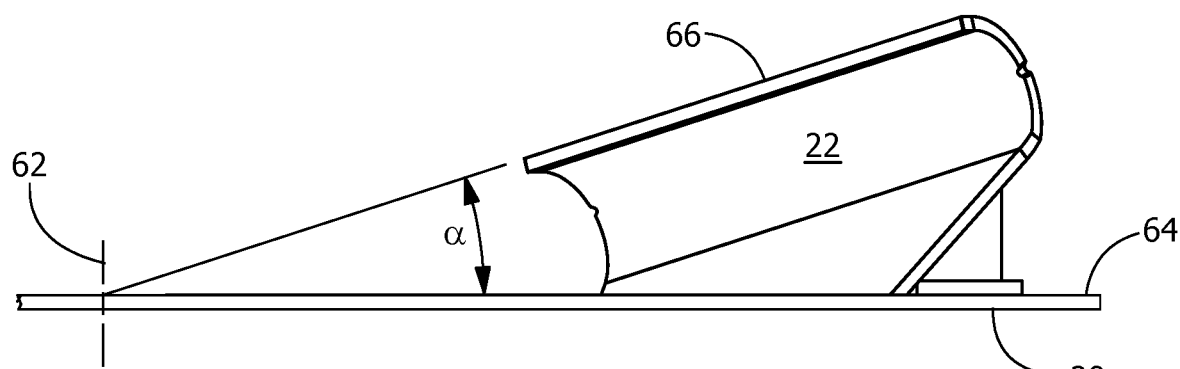
Figure 7:
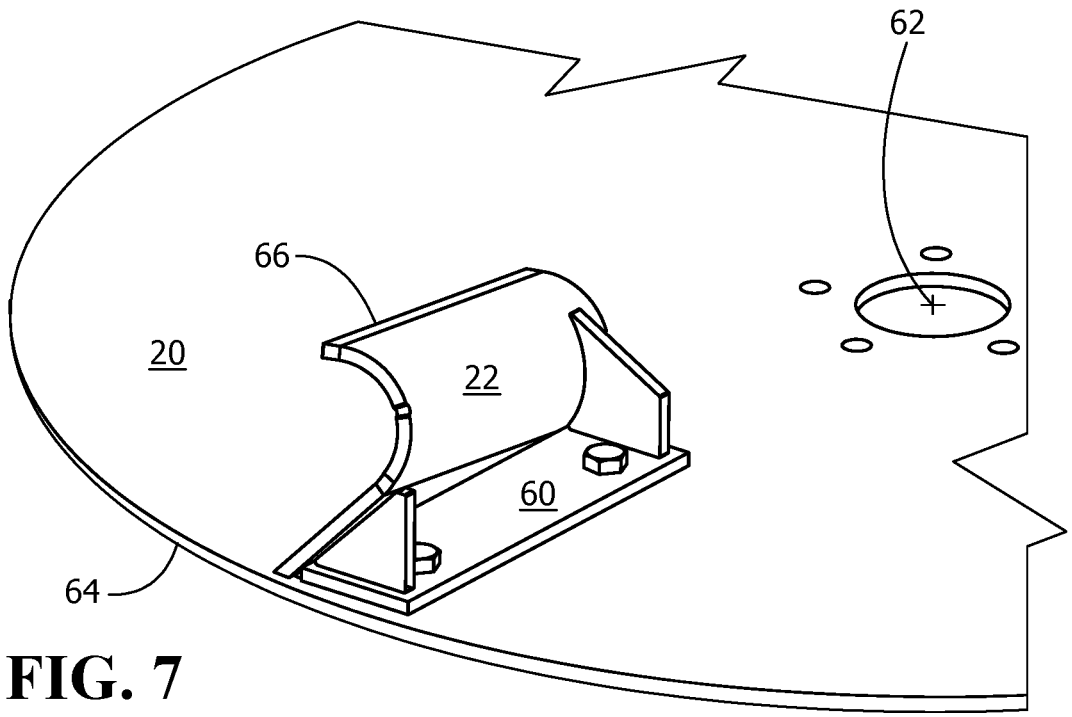
Figure 8:
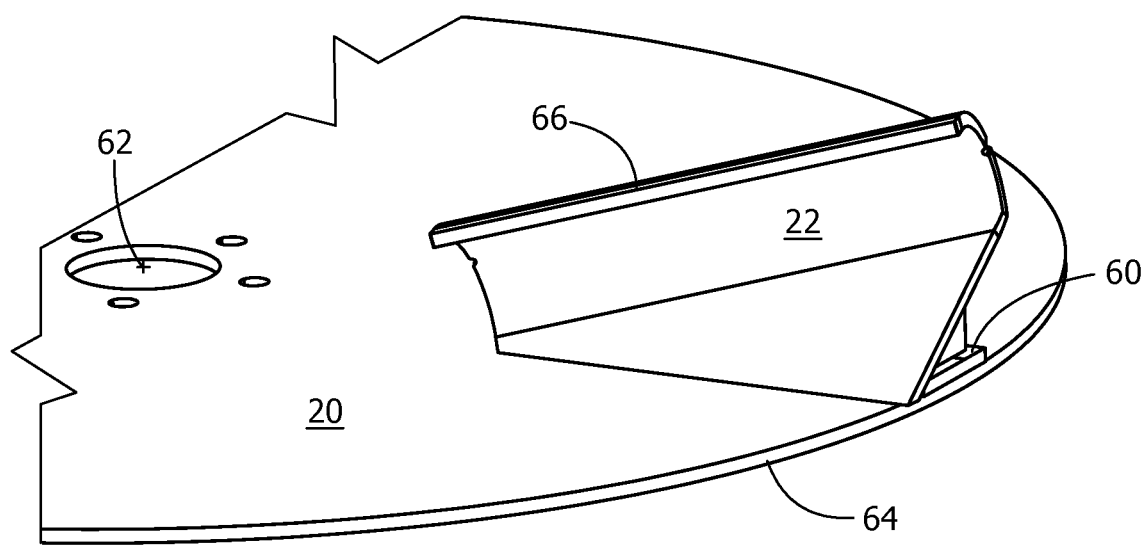
Figure 9:
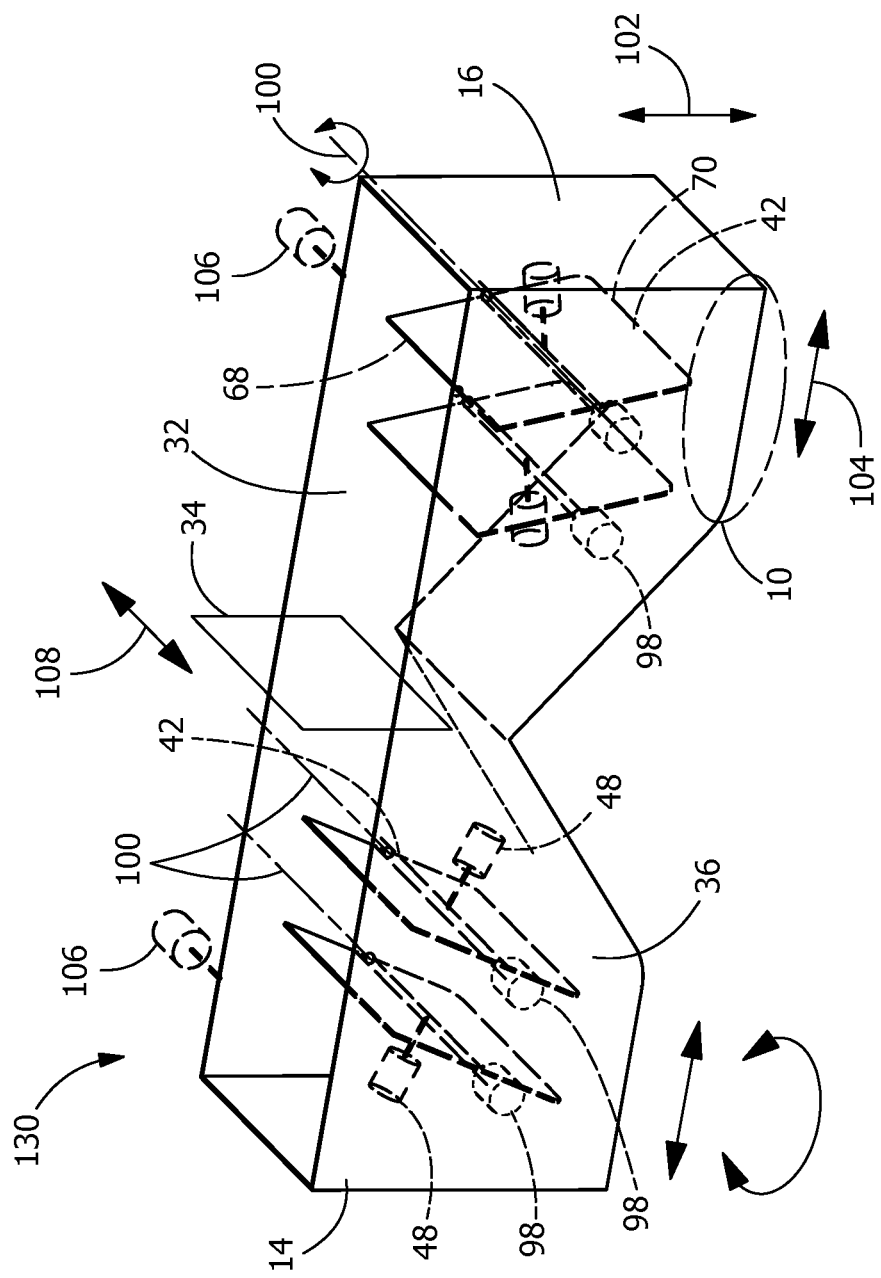
Figure 10:
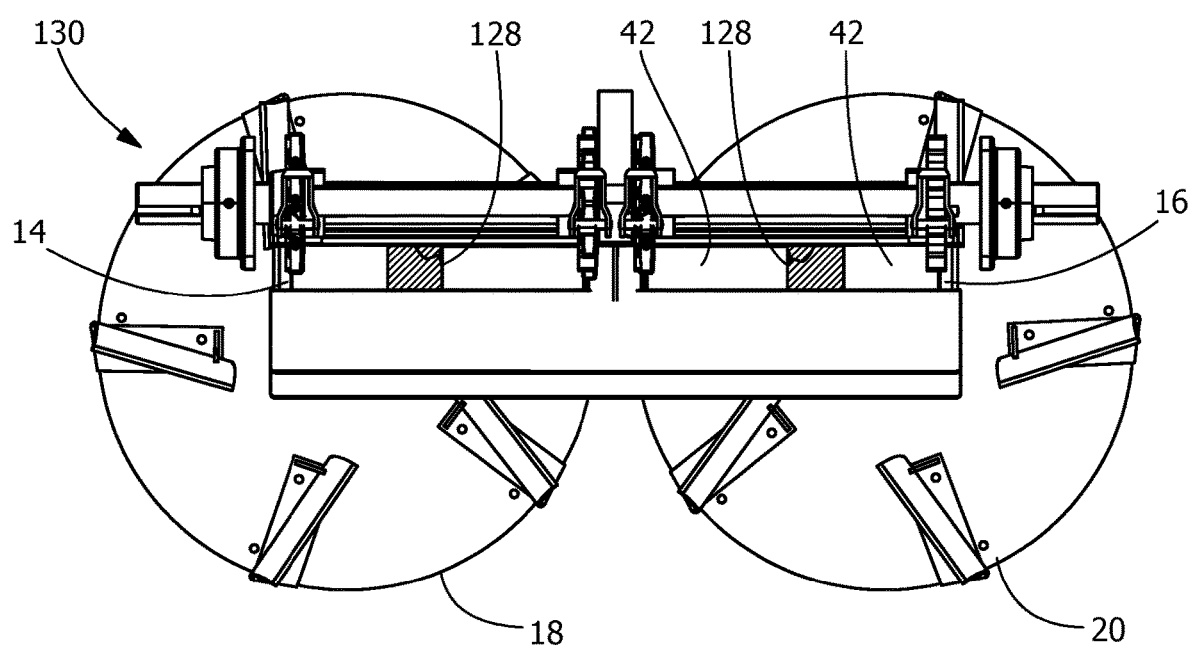

Attached to each disc 18, 20 is a plurality of generally radially oriented blades 22, preferably five, positioned to catch the material being directed by the second funnel unit 16 unto the disc 20 surface and throw the material outward as a result of centrifugal force of the rotating disc 20. As shown in FIGS. 7 and 8, the blade 22 is welded to a plate 60 which is mechanically attached to the disc 20, for example, by bolting or screwing. The blade 22 has an aerodynamic shape that maximizes the dispersion pattern. The blade increases in height as it moves from a central portion 62 of disc 20 towards a periphery 64, creating an angle α (FIG. 6) formed by a top edge 66 of blade 22 and the plane of the disc 20 of about 10 degrees to about 45 degrees, preferably about 15 degrees. In cross-section, the profile of the blade 22 may be straight or it may be "C" shaped or "V" shaped.

When viewed from the rear of the vehicle, the first disc 18 located on the left side rotates counter-clockwise, while the second disc 20 located on the right side rotates clockwise. In one embodiment, the rotation direction of each of discs 18, 20 may be reversed. In one embodiment, the two discs rotate at substantially the same RPM and may employ a common drive system. In one embodiment, the two discs can rotate at different RPMs independently of each other. Preferably, the discs lie in a substantially flat plane, although they may be angled such that their intersecting planes form either an acute or an obtuse angle.

The discs are substantially flat, with blades 22 being chamfered to provide for a smooth transition from disc 20 to blade 22. This smooth transition from disc 20 surface to blade 22 does not impede the flow of material from the surface of disc 20 to blade 22. Returning to FIG. 1, disc centers 62 are equidistant, central to the dispensing device 12 and rearward of the material drop off points. The discs are located at a distance of about 10 inches to about 24 inches below dispensing device 12, preferably about 18 inches.

Referring to FIGS. 1, 2, 2A, 2*b*, 3, 3A, 3B, 4, 5, 6, 7 and 8, in use, the present invention operates as follows: material to be spread exits storage hopper 28 onto conveyor or dispensing device 12 (or 12*a*, 12*b*), or alternatively, directly into funnel unit first ends 32. The flow of material from hopper 28 onto dispensing device 12 (or 12*a*, 12*b*) is controlled by the operator using methods well known in the art, for example, by increasing or decreasing the speed of the dispensing device and/or raising/lowering doors 78, 80 (or 78*a*, 78*b*, 80*a*, 80*b*) of door assembly 76. Dispensing device 12 (or 12*a*, 12*b*) transports the material to first end 32 of the funnel unit and deposits the material into funnel unit first end 32. As the material passes through second funnel unit 16, deflecting vanes 42 direct material onto a specific location of the rotating disc 20. The region of impact is important as this will affect the pattern of the distribution material. The longer the material remains in contact with the rotating disc 20, the greater the material will be thrown behind the vehicle. Material should generally contact the rotating discs without first coming into contact with the blades 22. The blades 22 of the rotating disc 20 gather the material deposited onto the disc 20 and through centrifugal force throws the material outward and rearward.

As shown schematically in FIG. 1, the spreader includes a controller 86, such as a computer or microprocessor-based controller. In one embodiment, controller 86 stores information, such as in the form of an electronic map, which is a representation of the area on which material is to be spread. In response to inputting a desired material application per unit area, the required rate of application of the spreadable material is calculated and stored. Controller 86 adjusts the rate of material flow provided to the discs, as well as the positions of the deflector vanes 42 in order to optimize the scattered pattern of material. Computer control of discs and dispensing devices is well known to those skilled in the art and is not described further herein.

Controller 86 receives an input signal from a GPS receiver 88 which provides information as to at least the position of the vehicle, and optionally also the direction and speed of the vehicle. The integration of GPS with controllers is well known to those skilled in the art and is not described further herein.

However, conventional spreaders, even with benefit of GPS, cannot selectably distribute material in a uniform scatter pattern and in a non-uniform scatter pattern in order to provide an optimal scatter pattern. That is, conventional spreaders are configured to apply a uniform scatter pattern which provides uniform coverage of the spread material over the throw width spectrum, but are not capable of selectively biasing the material scatter pattern to an outer extent or to an inner extent of the throw width spectrum.

The terms "throw," "throw width," "throw width spectrum," "material application spectrum" and the like may be used interchangeably.

FIG. 9 shows a drop box 130 which is an exemplary embodiment similar to drop box 30 of FIG. 4, except as shown. Drop box 130 includes actuators 98 rotatably connected to corresponding deflecting vanes 42 for selectably rotating the deflecting vanes about respective axes 100. As shown, axes 100 are positioned between opposed ends 68, 70 of vanes 42, such as generally centrally positioned between ends 68, 70. In one embodiment, axes 100 may be positioned at other locations between ends 68, 70. In one embodiment, a single actuator can incorporate axial movement in at least one of directions 102, 104 that are mutually perpendicular to a corresponding axis 100, in addition to rotational movement about the corresponding axis 100. Optionally, one or more actuators 106 can move drop box 130 relative to rotating discs 18, 22 (FIG. 1) in a direction 108 that is substantially parallel to axes 100 of corresponding deflecting vanes 42. In one embodiment, one or more actuators 106 can move drop box 130 relative to rotating discs 18, 22 (FIG. 1) in a direction 104 that is substantially transverse to corresponding axes 100 of deflecting vanes 42. In one embodiment, one or more actuators 106 can move drop box 130 relative to rotating discs 18, 22 (FIG. 1) in a combination of directions 104, 108.

FIG. 10, which is a view of drop box 30 and first and second funnel units 14, 16 taken along line 10-10 of FIG. 2, and more specifically, the funnel unit first end corresponding to rotating disc 20 is now discussed. For the sake of brevity, only rotating disc 20 will be described in detail, however, it should be appreciated that this detailed description applies to both rotating discs 18, 20. Material is directed by force of gravity between the pair of deflecting vanes 42 (FIGS. 2A, 2B) positioned within drop box 130, through funnel unit first end 32, before the material collides with disc 20 at a predetermined or pre-selected region of impact 128 (FIG. 10). As further shown in FIGS. 11-13, respective exemplary regions of impact 128A, 128B, 128C are representative of locations along funnel unit first end 32 that are vertically below and correspond to different positions of the proximate ends of the pair of deflecting vanes 42A, 42B relative to funnel unit first end 32 during operation of the spreader. For purposes of distinguishing between the pair of deflecting vanes, the deflecting vanes are further identified as deflecting vanes 42A, 42B.

FIGS. 11-13 are each views taken along line 11-11 of FIG. 2. FIGS. 11-13 include a guide unit 110 having connection locations 112, 114 that are guidingly movable in respective slots 116, 118 formed in a wall of second funnel unit 16. Slot 116 has opposed ends 120, 121, and slot 118 has opposed ends 122, 123. Connection locations 112, 114 are movably connected to respective deflecting vanes 42A, 42B. An actuator 124 (FIG. 2) is positioned adjacent dispensing unit 12*a* (FIG. 2). Actuator 124 selectively extends/retracts a cable 125 that is slidably movable within a conduit of an actuator assembly 126. An end of cable 125 is movably connected to a connection location 127 of guide unit 110. As further shown in FIGS. 11-13, in response to actuation of actuator 124 (FIG. 2), the end of cable 125 urges guide unit 110 into movement relative to a bracket 138 of actuator assembly 126, which likewise urges connection locations 112, 114, and thereby respective deflecting vanes 42A, 42B to be guidingly moves in respective slots 116, 118. As a result of guide unit 110 being simultaneously guidingly moved in slots 116, 118, a single actuator 124 may be used to control the positions of both deflecting vanes 42A, 42B.

FIGS. 11-13 correspond to exemplary positions of the ends of deflecting vanes 42A, 42B (proximate to end 36 of funnel unit 16), relative to each other and to rotational axis 140 of rotating disc 20. For example, in FIG. 11, region of impact 128A has a length 144 and has a spacing 146 from rotating axis 140. In FIG. 12, region of impact 128B has a length 148 and has a spacing 150 from rotating axis 140. In FIG. 13, region of impact 128C has a length 152 and has a spacing 154 from rotating axis 140. As shown in FIGS. 11-13, it is appreciated that as a result of deflecting vane 42A being constrained to a position defined by ends 120, 121 of slot 116 and deflecting vane 42B being constrained to a position defined by ends 122, 123 of slot 118, there may an amount of overlap between portions of regions of impact 128A, 128B, 128C. It is to be understood that deflecting vane 42A can be located at any position between ends 120, 121 of slot 116, with deflecting vane 42B positioned between ends 122, 123 of slot 118 as a result of the predetermined spacing between connection locations 112, 114, and that deflecting vane 42B can be located at any position between ends 122, 123 of slot 118, with deflecting vane 42A positioned between ends 120, 121 of slot 116 as a result of the predetermined spacing between connection locations 112, 114. In other words, the positions of deflecting vanes 42A, 42B are infinitely variable, and can have any number of regions of impact in addition to regions of impact 128A, 128B, 128C. In one embodiment, such as previously discussed, the position of each of the deflecting vanes may be independently controlled by separate actuators, and therefore would not constrained to maintain a predetermined spacing between reference positions during operation, such as between connections locations 112, 114 of guide unit 110.

It is to be understood that regions of impact 128A, 128B, 128C can be moved in directions 104, 108 (FIG. 9) by actuators 106, for example, to account for field conditions (e.g., slope), wind, material density or other factors that would affect the trajectory of material being spread.

Referring back to FIGS. 11-13, regions of impact 128A, 128B, 128C correspond to different mass distributions of material or mass distribution rates of material or distributions of material (e.g., pounds/ft2) versus distance (e.g., feet) for a given material application spectrum or throw distance or throw width. For purposes of discussion, the spectrum of throw distance is about 90 feet, although the throw distance may be greater than 90 feet, such as up to about 105 feet, or less than 90 feet. As shown in FIG. 11, region of impact 128A corresponds to an "outside distribution" or "outer distribution" or is representative of a material distribution profile that is biased toward the outside or outer extent of the material application spectrum, such as generally shown graphically in FIG. 14 as 160. In other words, for material distribution profile 160, a generally uniform mass distribution rate of material is maintained for a throw distance between DPARTIAL and DMAX, which represents a distance between DPARTIAL and DMAX.

Figure 12:
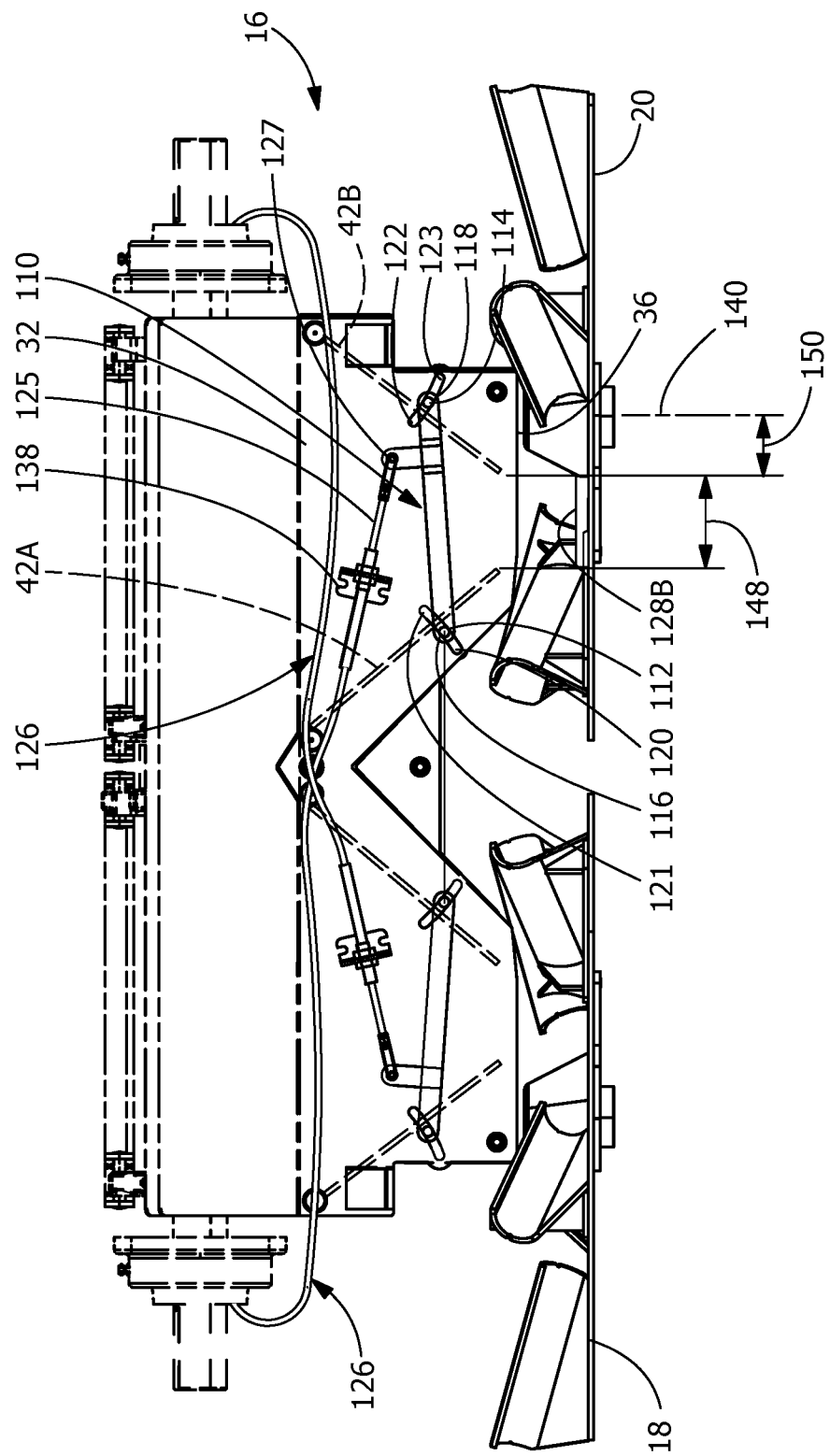
Figure 14:
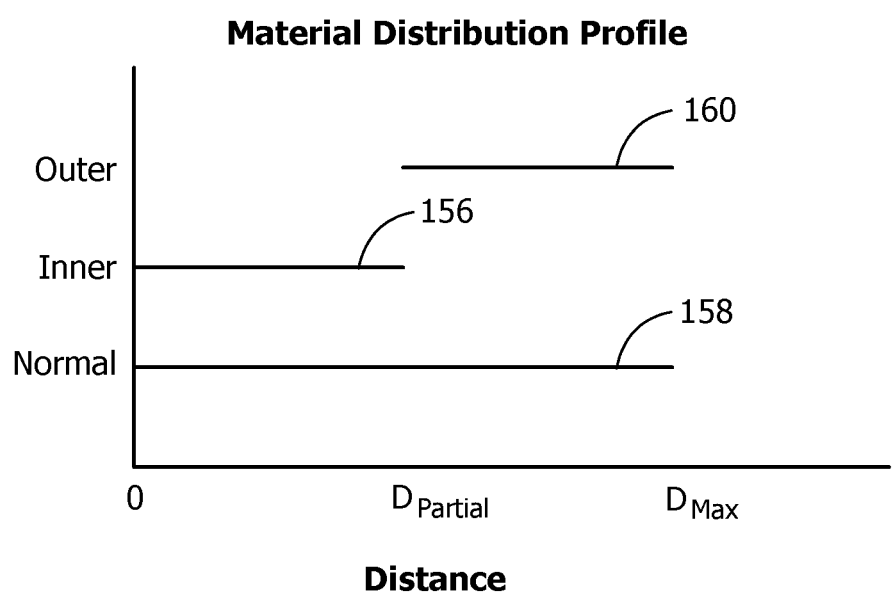

As further shown in FIG. 12, region of impact 128B corresponds to a "normal distribution" or is representative of a material distribution profile that is generally uniform over the material application spectrum, such as shown graphically in FIG. 14 as 158. In other words, for material distribution profile 158, a generally uniform mass distribution rate is maintained for a throw distance between zero and DMAX.

Figure 13:
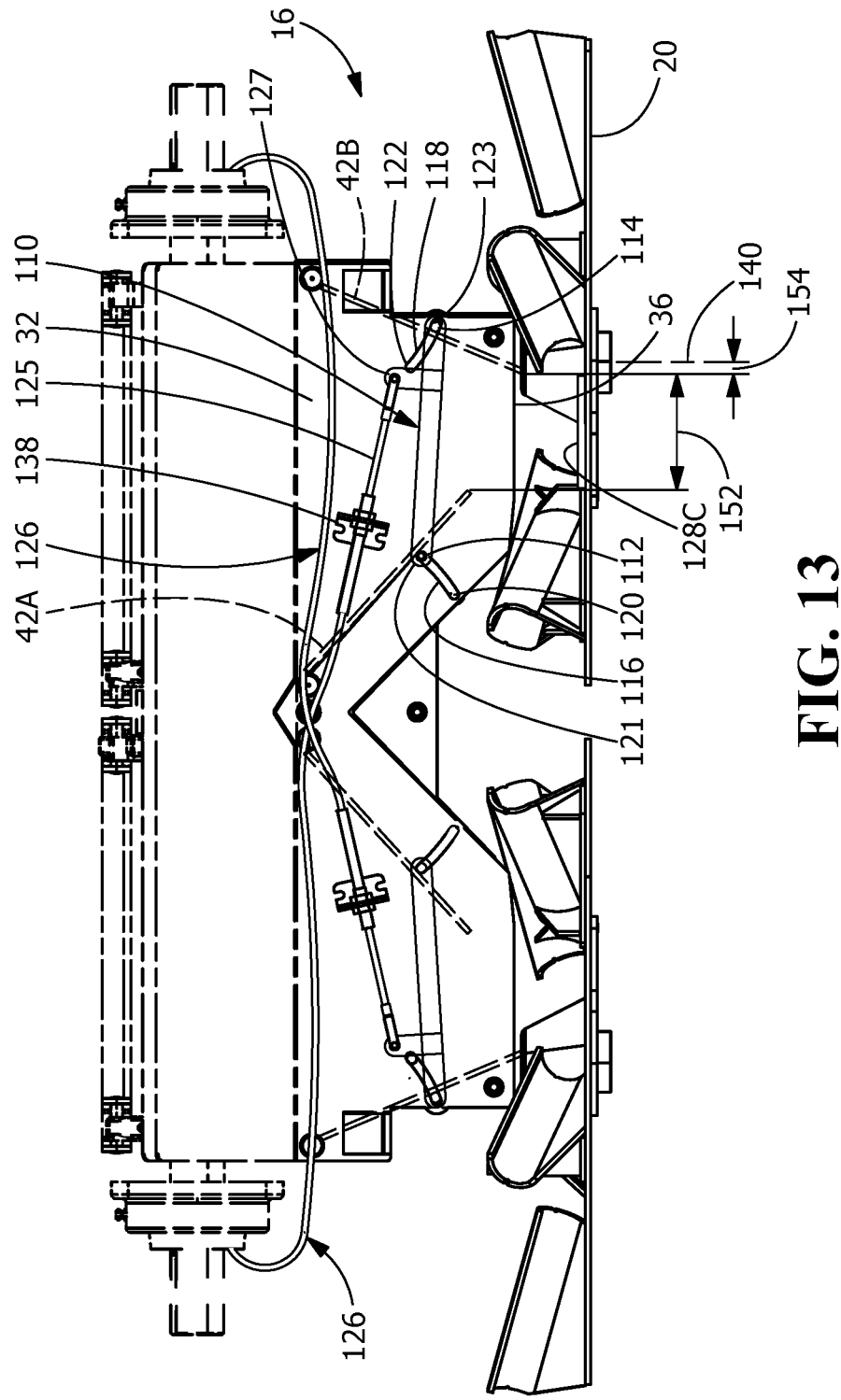

As further shown in FIG. 13, region of impact 128C corresponds to an "inside distribution" or "inner distribution" or is representative of a material distribution profile that is biased toward the inside or inner extent of the material application spectrum, such as shown graphically in FIG. 14 as 156. In other words, for material distribution profile 156, a generally uniform mass distribution rate is maintained for a near throw distance between zero and DPARTIAL.

As a result of being able to selectively transition between uniform or normal mass distribution and non-uniform mass distribution (i.e., "inside distribution" or "inner distribution" and "outside distribution" or "outer distribution"), an optimal distribution of material onto a surface can be achieved.

It is to be understood that the y-axis of FIG. 14 refers to identification of the types of material distribution profile, and is not intended to represent comparative magnitudes of material distribution of each type of material distribution profile relative to one another, and that the upper extent of distance of the inner distribution 156 and the lower extent of distance of the outer distribution 160 are provided for purposes of a general comparison of distance ranges of material application. In one embodiment, the upper extent of distance of the inner distribution 156 and the lower extent of distance of the outer distribution 160 are approximately the same. In one embodiment, the upper extent of distance of the inner distribution 156 and the lower extent of distance of the outer distribution 160 are different, such as the upper extent of distance of the inner distribution 156 being greater than the lower extent of distance of the outer distribution 160. In one embodiment, the upper extent of distance of the inner distribution 156 is less than the lower extent of distance of the outer distribution 160.

In one embodiment, each of material distribution profiles 156, 158, 160 (FIG. 14) can be achieved by positioning each of the deflecting vanes in their corresponding positions in the drop box, such as previously discussed, while maintaining the RPM of discs 18, 20 at the same fixed RPM relative to one another, which fixed RPM can be, for example, between 600-900 RPM, and while further maintaining the feed rate of material to each of the discs at the same feed rate relative to one another. Conventional spreaders, such as disclosed in U.S. Pat. No. 8,777,707 to Hoyle, require independent control of the flow of material to each spinning disc and independent control of the rotational speed of each spinning disc relative to one another.

Figure 11:
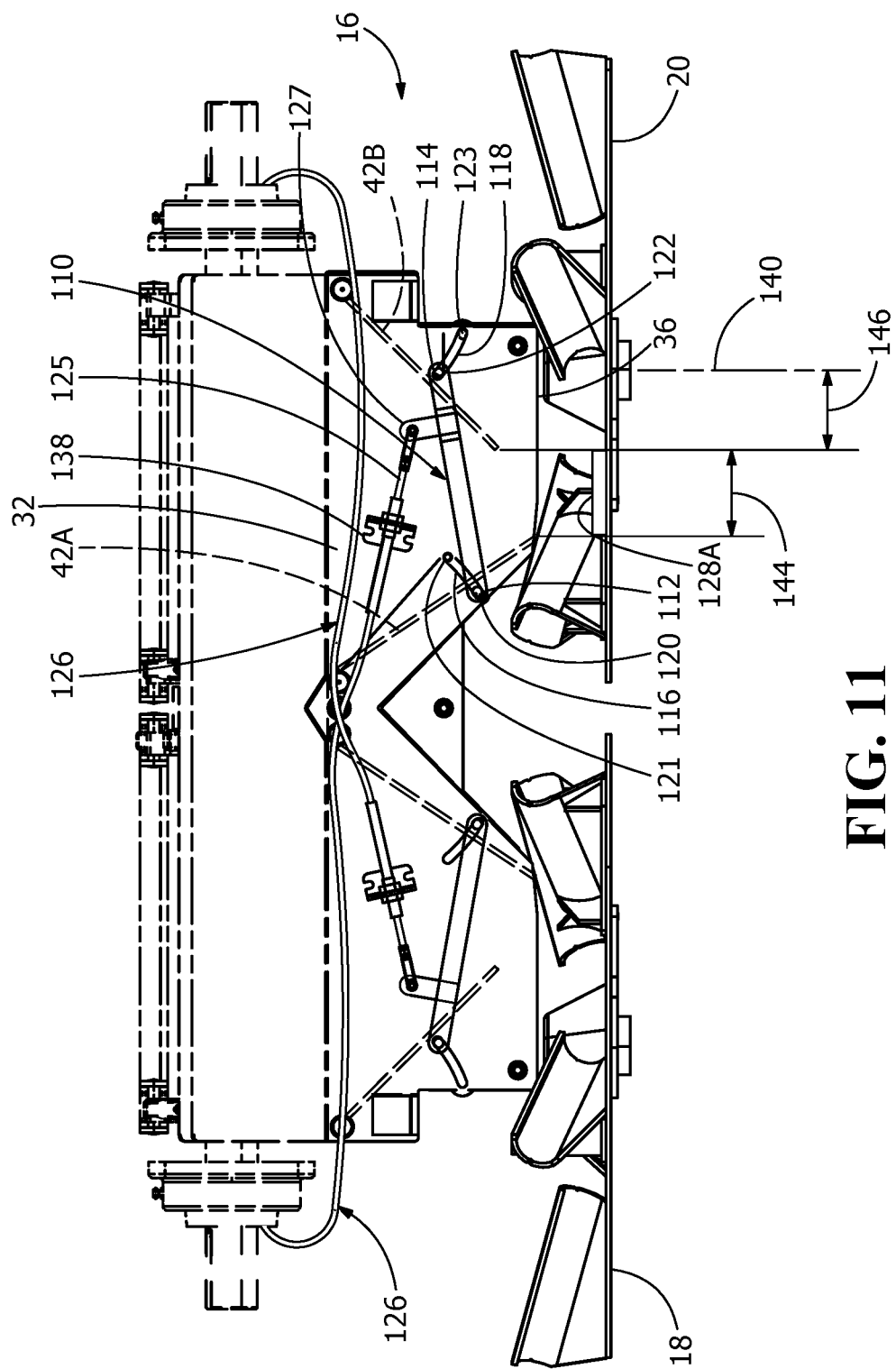
Figure 15:
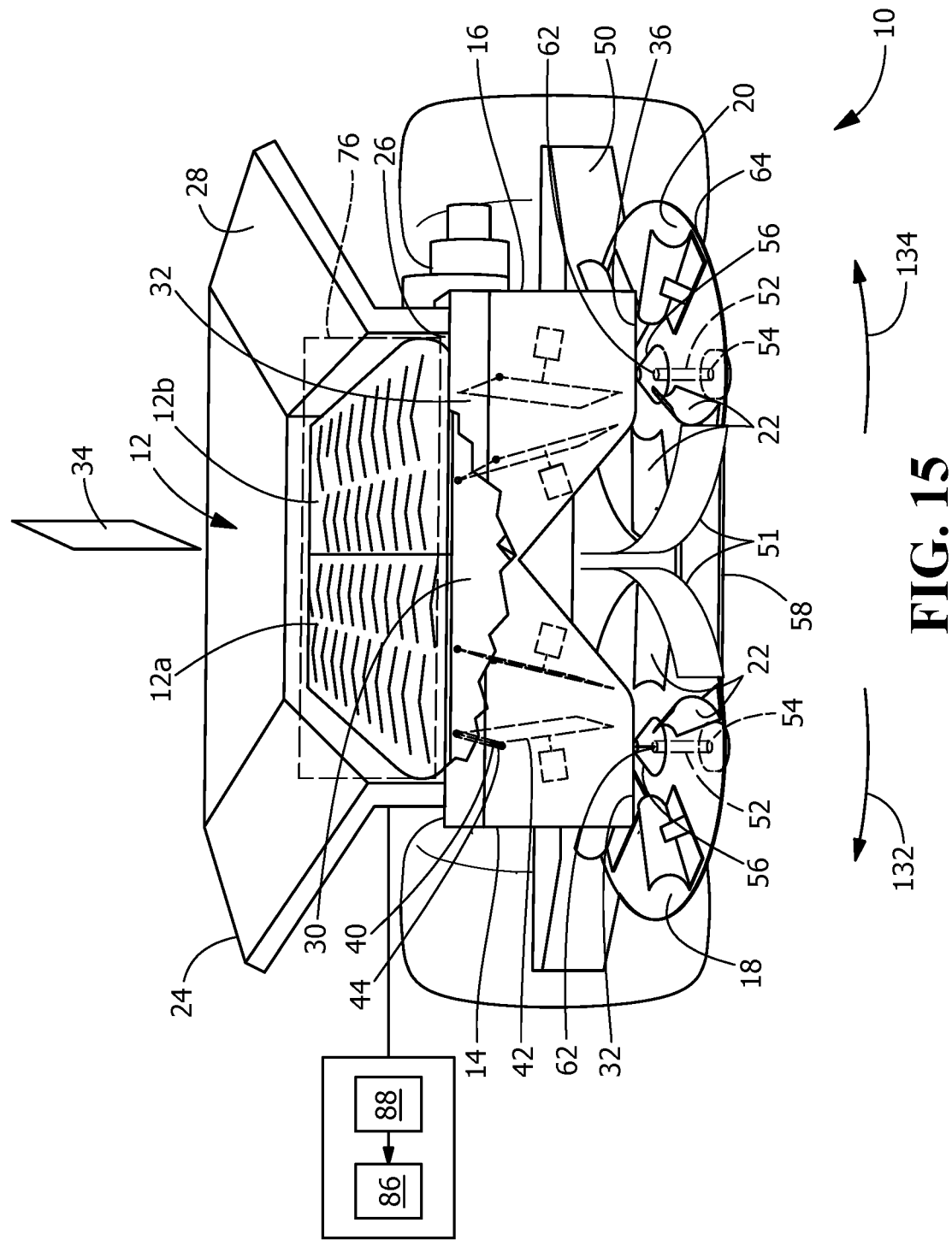

In one embodiment, such as shown in FIG. 15, one or more splash guards 51 may extend toward or along at least a portion of the periphery of at least one of first and second discs 18, 20. As shown, discs 18, 20 may each rotate in an opposite direction compared to respective directions 19, 21 (FIG. 1) (i.e., 132, 134) and have different minimum distances between a splash guard 51 and spindle 52, as well as different minimum distances from discs 18, 20 and splash guard 51. Referring again to FIG. 15, one or more vanes or shields or splash guards 51 may be positioned behind second funnel unit 16 and extending in a generally vertical direction toward or along a portion of the periphery of one or both of discs 18, 20. Splash guard 51 is used to prevent material from being thrown rearward underneath the storage vehicle 24. This plate may be manufactured of any rigid or semi-rigid material such as, for example, stainless steel, aluminum, or other metal, or plastic, for example, such as polycarbonate, polystyrene, nylon or other corrosive resistant material. In one embodiment, a separate splash guard 51 may correspond to each disc 18, 20. In one embodiment, one or more splash guards 51 may be pivoted toward or away from the discs to achieve a variation in the material spread profile similar to the material spread profile (FIG. 14) achieved by the deflecting vanes, such as deflecting vanes 42A, 42B (FIGS. 11-13) as previously discussed.

In one embodiment, the feed rate of material to each of the discs can be varied relative to each other, such as previously discussed. In one embodiment, the RPM of the discs 18, 20 can be varied independently of one another. In one embodiment, the direction of rotation of at least one of the discs may be reversed (of course, the orientation of the blades would also be reversed).

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A spreader for spreading a material comprising:
    at least one pair of funnel units, each funnel unit having a first end and an opposed second end, each funnel unit having a pair of deflecting vanes positioned therein between the first end and the second end, each pair of deflecting vanes being integrally fit and movably attached within each funnel unit of the at least one pair of funnel units, each deflecting vane of the pair of deflecting vanes movably connected to an actuator; and
    at least one pair of adjacent rotating discs having a plurality of radially oriented blades attached thereon for disbursing the material in a scatter pattern;
    each of a first disc and a second disc of the at least one pair of adjacent rotating discs rotatably positioned below the second end of one funnel unit of the at least one pair of funnel units to receive the material passing through the at least one pair of funnel units;

wherein each pair of deflecting vanes directs the material passing through the at least one pair of funnel units to a predetermined impact region on each of the rotating discs;

wherein a majority of the material is forming a single flow of material by each pair of the deflecting vanes, and the spreader is operating by modifying a location of the single flow of material to the predetermined impact region to adjust the scatter pattern by modifying the predetermined impact region on each of the rotating discs;

wherein each deflecting vane of each pair of deflecting vanes is selectably movable by the actuator from a first position to a second position as controlled by a controller while the spreader is operating to adjust the scatter pattern by modifying the predetermined impact region on each of the rotating discs.

2. The spreader of claim 1, wherein the at least one pair of rotating discs comprises the first disc rotating counter-clockwise positioned adjacent to the second disc rotating clockwise, the first disc and the second disc having the plurality of radially oriented blades attached thereon for disbursing the material in the scatter pattern.

3. The spreader of claim 2, wherein the first disc is positioned on the left of the second disc, when viewed from behind a forward direction of travel of the spreader.

4. The spreader of claim 1 further comprises a splash guard extending toward or along at least a portion of a periphery of the first disc and the second disc.

5. The spreader of claim 1 further comprises a Global Positioning System (GPS) receiver for sensing a position of the spreader and providing an output signal indicative of the position of the spreader to a controller, wherein the controller calculates a required pattern and density of the material to be spread by the at least one pair of rotating discs based on the position of the spreader, and controls a rate at which a dispenser dispenses the material to the at least one pair of rotating discs, and a position of the predetermined impact region on each disc of the at least one pair of rotating discs by the pair of deflecting vanes in order to obtain the required pattern and density of spread material.

6. The spreader of claim 1, wherein each actuator is configured for urging each corresponding deflecting vane to a position in which an application spectrum of the material is biased to an outer extent.

7. The spreader of claim 1, wherein each actuator is configured for urging each corresponding deflecting vane to a position in which an application spectrum of the material is biased to an inner extent.

8. The spreader of claim 1, wherein at least one actuator is a stepper motor.

9. The spreader of claim 1 further comprises a hopper having a dispenser and a dispensing outlet for dispensing material, the dispenser positioned intermediate the hopper and the dispensing outlet, the dispenser configured to dispense material to the first end of each funnel unit.

10. The spreader of claim 9 further comprises a door assembly having a door associated with each funnel unit, the door adapted to control an amount of material dispensed by the dispenser.

11. An apparatus for spreading a material comprising:

a hopper having a dispenser and a dispensing outlet for dispensing material, the dispenser positioned intermediate the hopper and the dispensing outlet;

at least one pair of funnel units, each funnel unit having a first end and an opposed second end, each funnel unit having a pair of deflecting vanes positioned therein between the first end and the second end, each pair of deflecting vanes being integrally fit and movably attached within each funnel unit of the at least one pair of funnel units, each deflecting vane of the pair of deflecting vanes movably connected to an actuator;

the at least one pair of funnel units attached in a vertical plane adjacent to the hopper such that each funnel unit first end receives the material from the hopper dispensing outlet and each funnel unit second end discharges the received material; and at least one pair of rotating discs comprised of a first disc and a second disc, the first and second discs having a plurality of radially oriented blades attached thereon for dispersing the material from the funnel second end in a scatter pattern;

the first and second discs each rotatably positioned below a corresponding one of the at least one pair of funnel units second ends to receive material passing through the second end of the at least one pair of funnel units;

wherein each pair of deflecting vanes directs the material passing through the second end of the corresponding funnel unit to at least one pre-selected impact region on each disc of the pair of rotating discs;

wherein a majority of the material is forming a single flow of material by each pair of the deflecting vanes, and the spreader is operating by modifying a location of the single flow of material to the predetermined impact region to adjust the scatter pattern by modifying the predetermined impact region on each of the rotating discs;

wherein each deflecting vane of each pair of deflecting vanes is movable by the actuator from a first position to a second position as controlled by a controller while the apparatus is operating to adjust the scatter pattern by modifying the predetermined impact region on each of the rotating discs;

the apparatus further including a Global Positioning System (GPS) receiver for sensing a position of the apparatus and providing an output signal indicative of the position of the apparatus to a controller, wherein the controller calculates a required pattern and density of material to be spread by the pair of rotating discs based on the position of the apparatus, and controls a rate at which the dispenser dispenses the material to the pair of rotating discs, and a position of the at least one pre-selected impact region on each disc of the pair of rotating discs by the pair of deflecting vanes in order to obtain the required pattern and density of spread material;

wherein the apparatus is capable of operating while maintaining a constant rotational speed of the first disc the same as a rotational speed of the second disc.

12. The apparatus of claim 11, wherein the dispenser is a conveyor.

13. The apparatus of claim 11, wherein the dispenser comprises a pair of conveyors.

14. The apparatus of claim 11, wherein each actuator is configured for urging each corresponding deflecting vane to a position in which an application spectrum of material is biased to an outer extent.

15. The apparatus of claim 11, wherein each actuator is configured for urging each corresponding deflecting vane to a position in which an application spectrum of material is biased to an inner extent.

16. The apparatus of claim 11 further comprises a splash guard extending along at least a portion of a periphery of the first disc and the second disc.

17. The apparatus of claim 11, wherein at least one actuator is a stepper motor.

18. The apparatus of claim 11, wherein the at least one pair of rotating discs comprises the first disc rotating counter-clockwise positioned adjacent to the second disc rotating clockwise, the first disc and the second disc having the plurality of radially oriented blades attached thereon for disbursing the material in the scatter pattern.

19. The apparatus of claim 18, wherein the first disc is positioned on the left of the second disc, when viewed from behind a forward direction of travel of the apparatus.

20. A method of spreading a material from an apparatus comprising:
    providing a hopper having a dispenser and a dispensing outlet for dispensing material, the dispenser positioned intermediate the hopper and the dispensing outlet;
    providing at least one pair of funnel units, each funnel unit having a first end and an opposed second end, each funnel unit having a pair of deflecting vanes positioned therein between the first end and the second end, each pair of deflecting vanes being integrally fit and movably attached within each funnel unit of the at least one pair of funnel units, each deflecting vane of the pair of deflecting vanes movably connected to an actuator, the at least one pair of funnel units attached in a vertical plane adjacent to the hopper such that each funnel unit first end receives the material from the hopper dispensing outlet and each funnel unit second end discharges the received material;
    providing at least one pair of rotating discs comprised of a first disc and a second disc, the first and second discs having a plurality of blades attached thereon for dispersing the material from the funnel second end in a scatter pattern, the first and second discs each rotatably positioned below a corresponding one of the at least one pair of funnel units second ends to receive material passing through the second end of the at least one pair of funnel units, wherein each pair of deflecting vanes directs the material passing through the second end of the corresponding funnel unit to at least one pre-selected impact region on each disc of the pair of rotating discs, wherein a majority of the material is forming a single flow of material by each pair of the deflecting vanes, and the apparatus is operating by modifying a location of the single flow of material to a predetermined impact region to adjust the scatter pattern by modifying the predetermined impact region on each of the rotating discs, wherein each deflecting vane of each pair of deflecting vanes is movable by the actuator from a first position to a second position as controlled by a controller while the apparatus is operating to adjust the scatter pattern by modifying the predetermined impact region on each of the rotating discs;
    controlling a rate at which the dispenser dispenses the material to the pair of rotating discs;
    controlling a position of the at least one pre-selected impact region on each disc of the pair of rotating discs;
    wherein the apparatus is capable of operating while maintaining a constant rotational speed of the first disc the same as a rotational speed of the second disc.

21. The method of claim 20, wherein controlling the rate at which the dispenser dispenses the material to the pair of rotating discs and controlling the position of the at least one pre-selected impact region on each disc of the pair of rotating discs are achieved using a GPS system.

22. The method of claim 20, wherein the first disc rotating counter-clockwise positioned left of a second disc rotating clockwise, when viewed from behind a forward direction of travel of the apparatus.

* * * * *